United States Patent [19]

Seto et al.

[11] Patent Number: 4,857,276
[45] Date of Patent: Aug. 15, 1989

[54] APPARATUS FOR TREATING EXHAUST GAS

[75] Inventors: Toru Seto; Shigeaki Mitsuoka, both of Kanonshin; Atsushi Morii, Chiyoda; Norihisa Kobayashi, Akunoura, all of Japan

[73] Assignee: Mitsubishi Jukogyo Kabushiki Kaisha, Tokyo, Japan

[21] Appl. No.: 51,734

[22] Filed: May 18, 1987

[30] Foreign Application Priority Data

May 26, 1986 [JP] Japan .................................. 61-119072

[51] Int. Cl.[4] ............................................ B01D 50/00
[52] U.S. Cl. ....................................... 422/171; 55/440; 55/443; 55/444; 55/446; 422/169; 422/177; 422/180
[58] Field of Search ............... 422/171, 177, 180, 900, 422/169; 55/440, 443, 444, 446

[56] References Cited

U.S. PATENT DOCUMENTS

| | | | |
|---|---|---|---|
| 1,044,208 | 11/1912 | Luhn | 55/444 X |
| 2,648,395 | 8/1953 | Pond, Jr. | 55/440 X |
| 2,793,709 | 5/1957 | White | 55/444 X |
| 2,828,818 | 4/1958 | Wright | 55/444 X |
| 3,110,581 | 11/1963 | Simpson | 55/444 X |
| 3,441,381 | 4/1969 | Keith et al. | 422/176 |
| 3,799,512 | 3/1974 | Raybon | 55/444 X |
| 3,998,599 | 12/1976 | Fedor | 422/180 |
| 4,065,918 | 1/1978 | Rifkin | 422/180 X |
| 4,512,787 | 4/1985 | Mathews | 422/171 X |
| 4,544,525 | 10/1985 | Honda et al. | 422/180 |
| 4,695,301 | 9/1987 | Okajima et al. | 422/180 |

Primary Examiner—Benoit Castel
Assistant Examiner—Amalia L. Santiago
Attorney, Agent, or Firm—Jules E. Goldberg

[57] ABSTRACT

The present invention is directed to a method for treating an exhaust gas containing dust composed of a glassy material and a sticky material consisting principally of CaO in a gas parallel flow type solid-gas contact reactor, the aforesaid method being characterized by including the step of forcing the dust to collide with a solid surface on the upstream side of the reactor in order to separate the dust into the glassy material and the sticky material consisting principally of CaO; and the present invention is also directed to an apparatus for the above method, the apparatus being characterized by including a collision device for colliding with the dust which is disposed in an exhaust gas flow path on an upstream side of the reactor.

1 Claim, 9 Drawing Sheets

ANGLE θ° OF COLLISION PLATE

GAS FLOW SPEED 12m/sec
STEP NUMBER OF COLLISION PLATE 1

METHOD AND APPARATUS FOR TREATING EXHAUST GAS

FIELD OF THE INVENTION AND RELATED ART STATEMENT

The present invention relates to a method and an apparatus for treating an exhaust gas in a gas parallel flow type solid-gas contact reactor. In particular, the present invention relates to a dry smoke denitrating method and apparatus in which a gas parallel flow type catalyst section is used and by which an exhaust gas from a coal-fired boiler is treated. The method and the apparatus of the present invention can be applied to a system for carrying out denitration and desulfurization treatments simultaneously, another system for desulfurizing a coal-gasified gas, and other systems.

Figure 14:
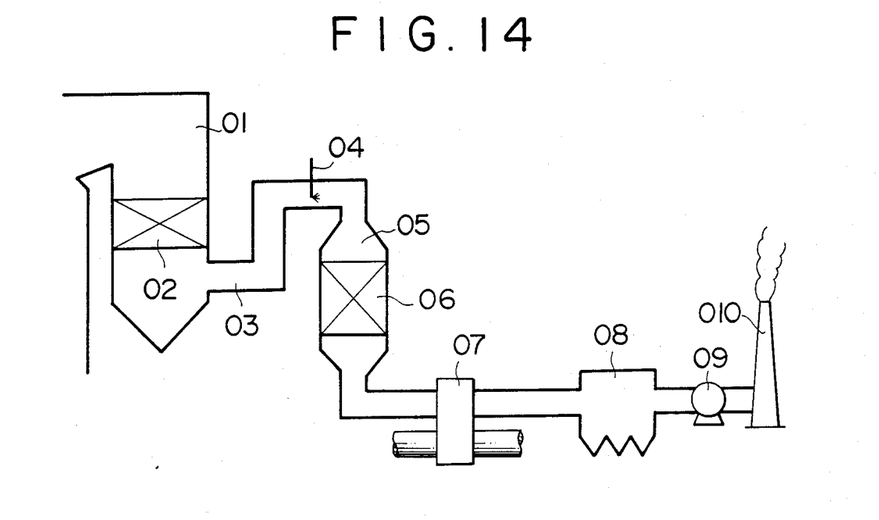
Fig. 14 shows the whole arrangement of a conventional system in which there is disposed a dry smoke denitrating apparatus for an exhaust gas from a coal-fired boiler.
Figure 15:
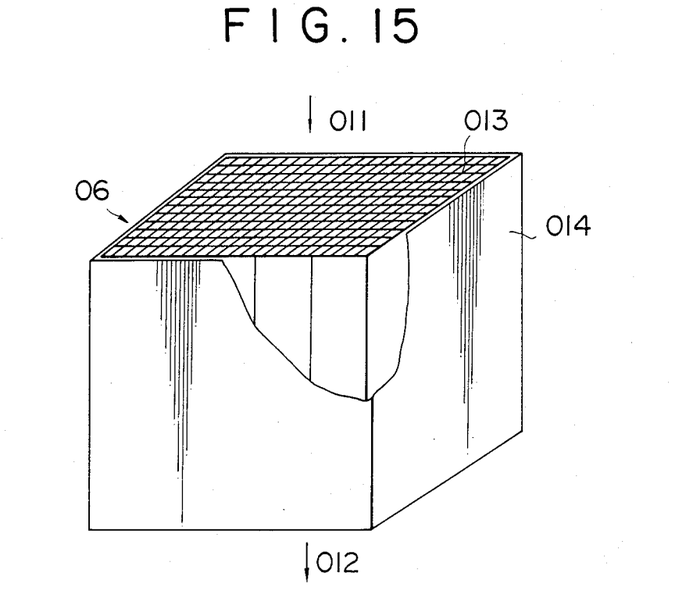
Fig. 15 is a detailed perspective view of a gas parallel flow type catalyst section with which a denitration reactor is packed.

Figs. 14 and 15 attached hereto show a conventional dry smoke denitrating apparatus for treating an exhaust gas from a coal-fired boiler, which technique is disclosed in Japanese Patent Application No. 024539/1982.

In Fig. 14, an exhaust gas is delivered from a boiler 01 through an economizer 02 and a flue 03 to a denitration reactor 05, and on the way an $NH_3$ gas for denitration reaction is injected through a gas injection inlet 04 into the exhaust gas streaming through the flue 03. When the exhaust gas passes through a gas parallel flow type catalyst section 06 in the denitration reactor 05, the component $NO_x$ in the exhaust gas is decomposed into nitrogen and water. Afterward, the exhaust gas passes through an air heater 07, an electric dust collector 08 and an exhaust gas blower 09, and is then discharged from the system through a chimney 010 into the atmosphere.

Fig. 15 shows a detailed perspective view of a conventional gas parallel flow type catalyst section 06 disposed in the denitration reactor 05. In this drawing, reference numeral 011 is an inlet exhaust gas, numeral 012 is an outlet exhaust gas, 013 is a lattice catalyst, and 014 is a package which is packed with the plurality of catalysts 013.

In such a catalyst section in which the plural gas parallel flow type catalysts are arranged, the gas streams along the surfaces of the catalysts. Therefore, dust flows together with the gas along the catalyst surfaces, so that a contact chance between the dust and the catalyst surfaces is low, with the result that the sticking of the dust onto the catalyst surfaces is not so perceptible.

However, in the case that the exhaust gas containing the particularly sticky dust is treated, the dust sticks to and accumulates on the edge portions of the catalysts on the gas inlet side and the inlet peripheries of gas passage holes of the catalysts in the gas parallel flow type catalyst section, and finally the gas passage holes will be narrowed and some of the holes will be clogged with the dust. Alternatively, in some cases, the dust sticks to or accumulates on the surfaces of the catalysts in the catalyst section through which the gas passes. This fact will lead to the increase in a pressure loss in the reactor and the decline in an activity of the catalysts, so that the operation of the apparatus will be impossible.

As a measure for the resolution of the above troubles, a dust remover, i.e., a suit blow device is equipped in the apparatus.

When the suit blow device is used, a gas can be jetted from a gas inlet side or a gas outlet side of the catalyst section in order to remove the accumulated dust therefrom. By the use of this means, the dust on the catalyst end surfaces on the inlet side of the catalyst section and on the inlet peripheries of the gas passage holes in the catalysts can be removed substantially perfectly therefrom. However, the dust on the surfaces of the catalysts in the catalyst section cannot be eliminated effectively therefrom even by the above means, so that it is impossible to prevent the activity of the catalysts from deteriorating owing to the dust on the catalyst surfaces, though the increase in the pressure loss can be inhibited.

OBJECT AND SUMMARY OF THE INVENTION

An object of the present invention is to solve these problems of the above conventional method and apparatus.

That is, a method of the present invention is characterized by including the step of forcing sticky dust to collide with a certain solid surface on the gas inlet side, i.e., on the upstream side of a parallel flow type catalyst section in order to render the dust less sticky to the surfaces of catalysts. And an apparatus of the present invention is characterized by additionally including a dust collision device disposed on the gas inlet side, i.e., on the upstream side of a parallel flow type catalyst section.

Other objects, features and benefits of the present invention will be more elucidated from the following detailed description and drawings.

BRIEF DESCRIPTION OF THE DRAWINGS

Figs. 13(a), (b) and (c) are plan views of other collision plates, and Figs. 13(a'), (b') and (c') are corresponding side views;

DETAILED DESCRIPTION OF PREFERRED EMBODIMENTS

Table 1 sets forth exemplary analytical values of main components of fly ashes as well as alkaline earth metals and alkaline metals concerned with a stickiness which are contained in exhaust gases from a coal-fired boiler.

TABLE 1
Composition of Fly Ash and Other Components

| Component | Fly Ash A (wt %) | Fly Ash B (wt %) |
|---|---|---|
| $SiO_2$ | 56.0 | 32.5 |
| $Al_2O_3$ | 19.0 | 18.9 |
| $Fe_2O_3$ | 2.9 | 8.6 |
| $CaO$ | 3.8 | 23.9 |
| $MgO$ | 0.7 | 4.7 |
| $Na_2O$ | 2.5 | 4.5 |
| $K_2O$ | 1.1 | 1.4 |
| $SO_3$ | 0.5 | 4.6 |

In Table 1, the fly ash A is that which has been obtained from an exhaust gas of a usual coal (which is chiefly composed of bituminous coal) often used recently in industrial boilers in Japan, and the fly ash B is that which has been obtained from an exhaust gas of a poor material called lignite.

In both the fly ashes, the main components are $SiO_2$ and $Al_2O_3$. With regard to the fly ash A, concentrations of the alkaline earth metal oxides and the alkaline metal oxides such as $CaO$, $MgO$, $K_2O$ and $Na_2O$ concerned with the stickiness are relatively low, but with regard to the fly ash B, CaO of these components is contained therein at a particularly high concentration.

In the fly ash A, most of the alkaline earth metal oxides and the alkaline metal oxides are dissolved in glassy fine spheres made from an $SiO_2/Al_2O_3$ compound, and in consequence the concentrations of these metallic oxides in the surface layers of the fly ash grains are low and these grains have a relatively high hardness.

Therefore, even when the exhaust gas formed by the combustion of such a kind of coal is treated in the conventional gas parallel flow type reactor, the fly ash does not stick to the catalyst surfaces, though it collides with the catalyst surfaces in the reactor. Further, the alkaline metal oxides and the alkaline earth metal oxides in the fly ash scarcely stick to the catalyst surfaces, and rather the catalyst surfaces are worn by an impact force at the time of the collision of the fly ash. Therefore, any particular problem regarding performance is not present herein.

However, with regard to the fly ash B, a concentration of CaO therein is very high, and thus a relatively soft and viscous material composed chiefly of CaO surrounds glassy fine spheres comprising an $SiO_2/Al_2O_3$ compound. When caused to stream through the conventional gas parallel flow type catalyst section, such viscous fly ash grains collide with the catalyst surfaces, and at this time, part of them are forcedly pressed against the catalyst surfaces and stick thereto, so that they are left in the catalyst section.

Each of these glassy fine grains is several tens of microns in average diameter, and therefore an impact force of each grain against the catalyst surface is great to some extent. However, since the glassy grains are covered with the soft CaO material, the shock of the collision is not so strong as to wear the catalyst surfaces and to release the previously sticked grains therefrom. In short, it can be considered that the glassy grains are characteristically liable to stick to the catalyst surfaces.

If the catalyst surfaces are soiled with such a material consisting principally of CaO, the diffusion of the gas into the catalysts will be disturbed and the activity of the catalysts will be lost gradually.

In view of the above fact, the inventors of the present application have contemplated that the soft material consisting principally of CaO around the fly ash grains is separated, as perfectly as possible, from the glassy material consisting principally of the $SiO_2$-$Al_2O_3$ compound in the fly ash grains, and the separated materials are carried on an exhaust gas toward the conventional gas parallel flow type catalytic reactor.

Finally, the inventors have found that the peripheral CaO material can be separated from the core glassy material by forcing the fly ash to collide with the surfaces of solid collision plates disposed on the upstream side of the catalyst section.

The thus separated grains will behave in the catalyst section, as follows:

In the first place, the sticky grains mainly comprising CaO collide with the catalyst surfaces. Afterwards they stream on a gas flow without sticking thereto, because they are small in diameter (about several microns) and also small in mass, and because their pressurizing force against the surfaces is weak.

Further, even if the grains have sticked on the surfaces, they will be released therefrom by means of an impact force, when the $SiO_2$-$Al_2O_3$ glassy fly ash grains having hard surfaces collide with the catalyst surfaces. As a result, the catalyst surfaces are scarcely contaminated with the sticked grains, which effect permits maintaining a performance of the catalysts stably for a long period of time.

Now, the present invention will be described in detail in accordance with embodiments.

Figure 1:
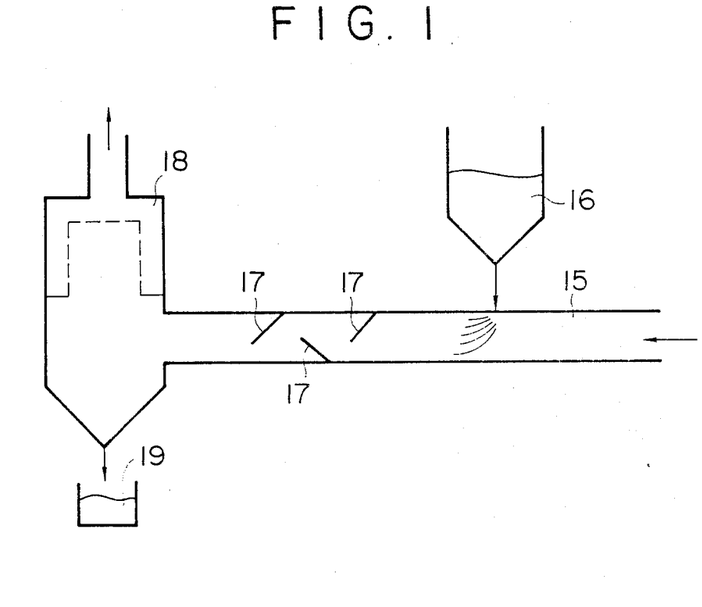
Figs. 1 and 2 show schematic views of test apparatuses for a method of treating an exhaust gas regarding the present invention.

(1) With regard to a treating method of the fly ash B by the use of an apparatus shown in FIG. 1, investigation was conducted.

In this apparatus, a fly ash 16 of the kind B in Table 1 was uniformly dispersed in an air flow 15, was then forced to collide with metal collision plates 17, was treated by a bag filter, and was at last collected as a fly ash 19. The step number of the metal collision plates 17 is variable and can be selected arbitrarily. Degrees of a separation between the glassy material and the CaO material were estimated by first separating the fly ash 19 on the basis of grain diameters, and then chemically analyzing the separated fly ashes and comparing enlarged electron microscope photographs thereof. The obtained results are set forth in Table 2 given below.

TABLE 2

| Gas Flow Speed (m/sec) | Step Number of Collision Plates | | | |
|---|---|---|---|---|
| | 1 | 2 | 3 | 4 |
| 2 | X | X | ○ | Δ |
| 4 | X | Δ | ○ | ○ |
| 8 | Δ | Δ | ○ | ○ |
| 12 | ○ | ○ | ○ | ○ |

X: Scarcely separated.
Δ: Slightly separated.
○: Well separated.

Figure 2:
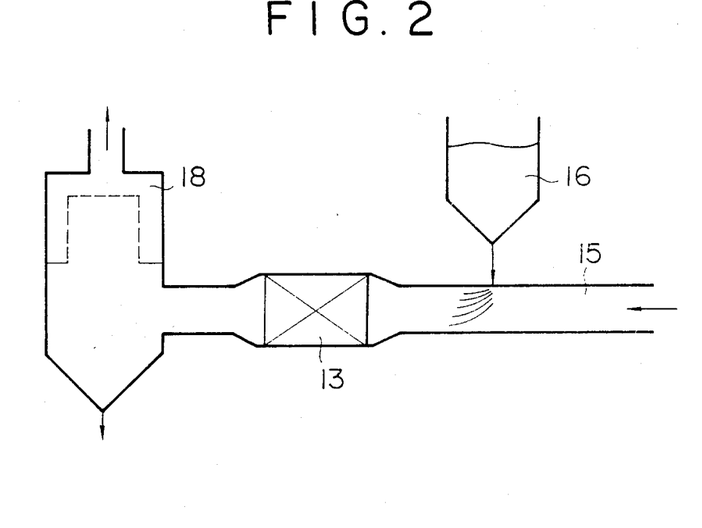

(2) By the use of an apparatus shown in FIG. 2, a test was carried out for a contamination degree of catalyst surfaces with the fly ash which had been treated in the preceding paragraph (1) and the untreated fly ash. In this apparatus, a fly ash 16 was dispersed in an air flow 15 and was then introduced into a catalyst section 13 having lattice catalysts which was disposed on the downstream side of the fly ash introducing position. After the test, the lattice catalysts were taken out from the catalyst section 13 and were then subjected to a fluorescent X-ray analysis in order to inspect, as the contamination degree, an X-ray intensity which was indicative of a Ca level on the surface of the catalyst. In addition, a denitration performance was examined by the use of a catalyst activity testing device.

Table 3 sets forth conditions for the test by the apparatus in FIG. 2, and Table 4 set forth conditions for the catalyst activity test.

Figure 3:
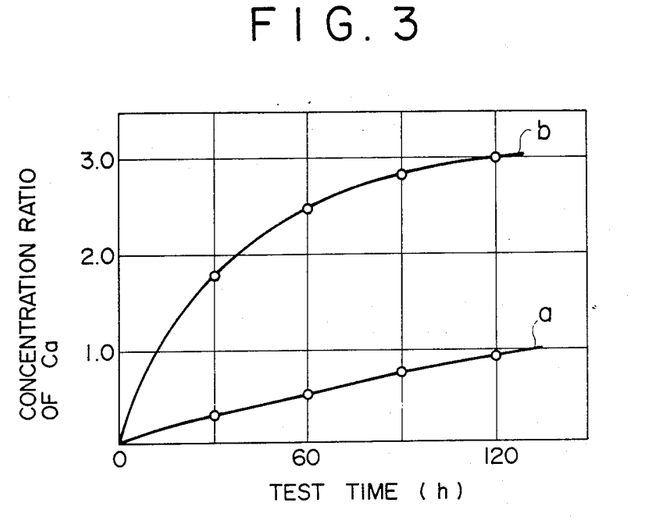
Fig. 3 shows the measured results of an X-ray strength of Ca which is stuck on the surface of catalysts after a stickiness test.
Figure 4:
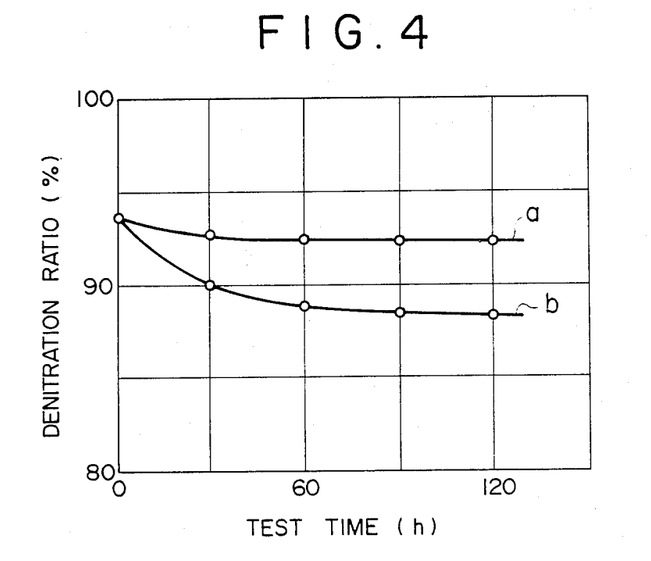
Fig. 4 shows results of an activity test of the catalysts in Fig. 3.

FIG. 3 shows the results of the measured X-ray intensity of Ca on the catalyst surfaces, and they are indicated by a ratio of b to which will be described hereinafter. FIG. 4 shows the results of the catalyst activity test.

In FIGS. 3 and 4, the line a represents the results of the contamination test regarding the fly ash which was treated in the above paragraph (1), and the line b represents those of the contamination test regarding the untreated fly ash.

The test results of the lines a and b indicate that the collision treatment of the fly ash is very effective to prevent the catalyst surfaces from soiling on the downstream side of the collision treatment process.

TABLE 3

| | Test Conditions | | |
|---|---|---|---|
| Catalyst | Conc. of Fly Ash | Gas Speed* | Gas Temp. |
| Ti-V | 10 g/m$^3$ | 6 m/sec | Ordinary Temp. |

*A gas speed through a vacant flow path.

TABLE 4

| | Conditions for Activity Test | |
|---|---|---|
| | Catalyst Section | Used Gas |
| SV Value | 3,000 1/17 | Exhaust gas* |
| Temp. | 350° C. | NO$_x$ 150 ppm, SO$_x$ 680 ppm |
| NH$_3$/NO$_x$ Ratio | 1.0 | H$_2$O 8.5 vol % |

*An exhaust gas from heavy oil combustion.

Figure 5:
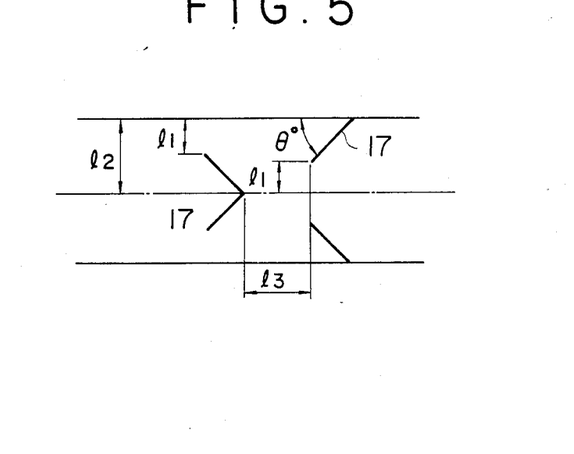
Fig. 5 shows an arrangement state and a size of collision plates in the test apparatus shown in Fig. 1.
Figure 6:
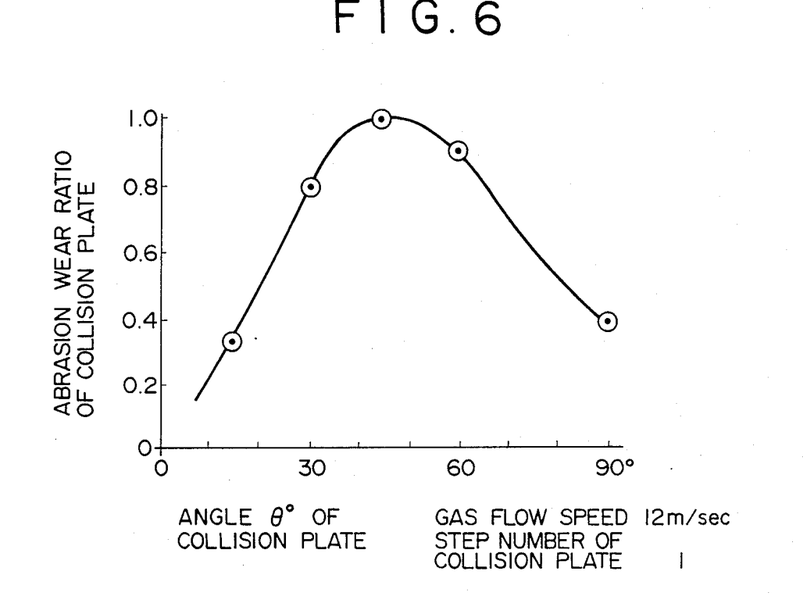
Fig. 6 is a diagram showing a relation between an inclination degree of the collision plate and a collision efficiency.

FIG. 5 shows an arrangement state and a size of the collision plates 17 in FIG. 1. A test was carried out by feeding the fly ash 16 and by altering an inclination angle $\theta$ within the range of 0° to 90°. A maximum value of a collision efficiency of the fly ash was decided as an optimum value, and this collision efficiency was regarded as the indicator of an abrasion wear on the collision plate 17. The obtained test results are set forth in FIG. 6. They indicate that when the inclination angle of the collision plates is 45°, the collision efficiency is at the maximum level, and a desirable inclination angle is within the range of about 30° to about 60°.

In FIGS. 1 and 5, the two steps of collision plates 17 were disposed in the air flow path 15, an opening ratio ($l_1/l_2 \times 100$) of the collision plate 17 was altered within the range of 30 to 80%, and the fly ash 16 was fed, whereby the optimum value was sought, regarding the abrasion wear of the collision plate 17 as the indicator of the collision efficiency.

Figure 7:
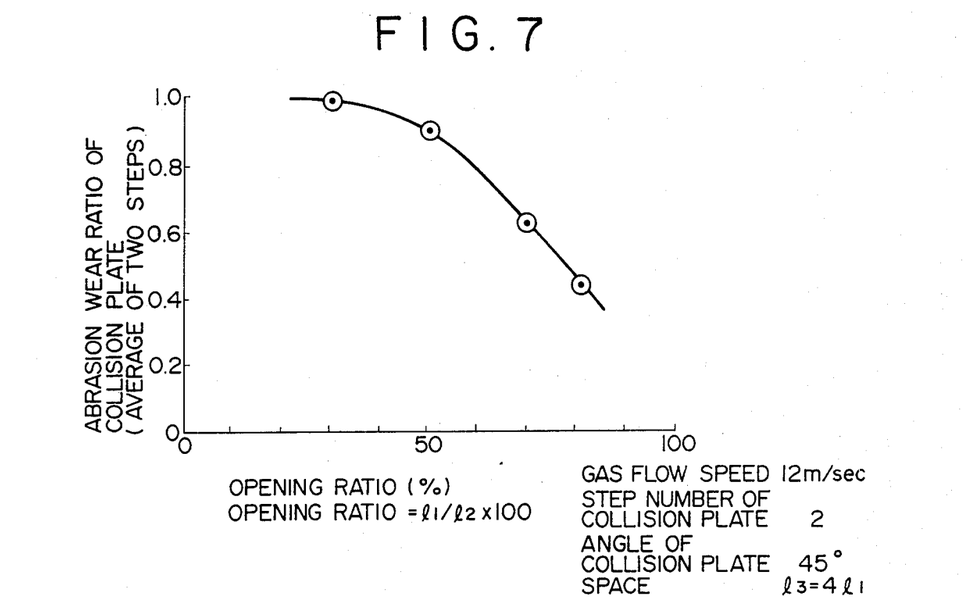
Fig. 7 is a diagram showing a relation between a collision efficiency and an opening ratio (which is $\ell_1/\ell_2 \times 100$; $\ell_1$ and $\ell_2$ are in Fig. 5)

FIG. 7 shows the test results. It is apparent therefrom that the smaller the opening ratio is, the higher the collision efficiency is, but in the extent in which the opening ratio is 50% or less, the collision efficiency does change greatly. Taking the increase in a pressure loss into consideration, the opening ratio of about 50% is optimum and the opening ratio range of about 30 to about 70% is desirable.

In FIGS. 1 and 5, a space $l_3$ between the first step and the second step of the collision plates 17 was altered, whereby the optimum value was sought, regarding the abrasion wear of the pair of collision plates 17 on the downstream side as the indicator of the collision efficiency. The obtained test results are set forth in FIG. 8.

Figure 8:
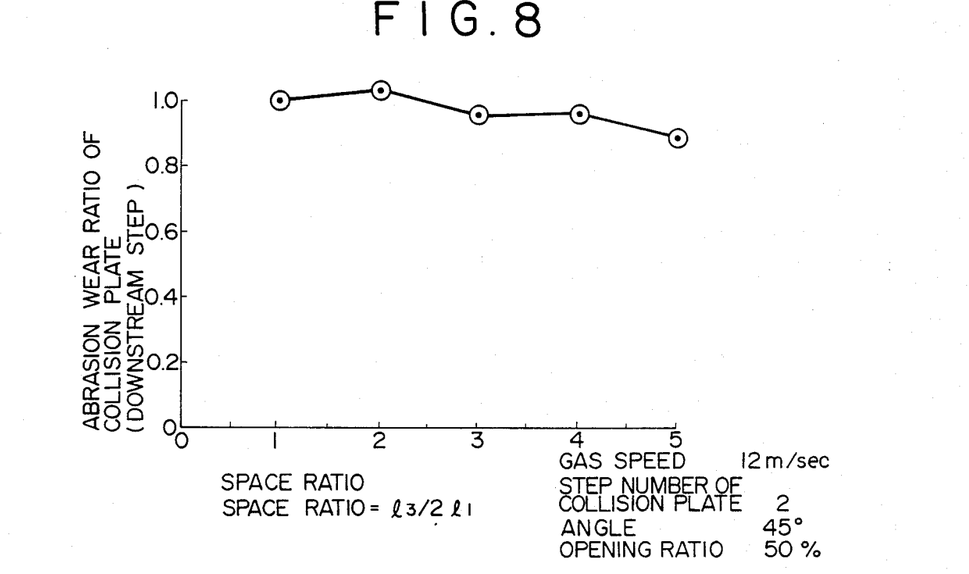
Fig. 8 is a diagram showing a relation between a collision efficiency and a space ratio (which is $\ell_3/2\ell_1$; $\ell_3$ and $\ell_1$ are in Fig. 5)

The test results indicate that when a space ratio $l_3/2l_1$ of the space $l_3$ to the opening diameter $2l_1$ is within the range of 1/1 to 5/1, the abrasion wear ratio does not change greatly, but there is the tendency that the greater the space $l_3$ is, the lower the abrasion wear ratio is, though this tendency is slight. It can be considered that the preferable space ratio $l_3/2l_1$ is within the range of about 1 to about 4.

The present invention has been described in reference to the coal-fired fly ash, but needless to say, the present invention is not limited to the above embodiments but can be applied to other kinds of similar sticky dust. Further, the above mentioned collision plates may be replaced with other members, in so far as they have collision surfaces.

(3) Next, reference will be made to an apparatus regarding the present invention.

Figure 9:
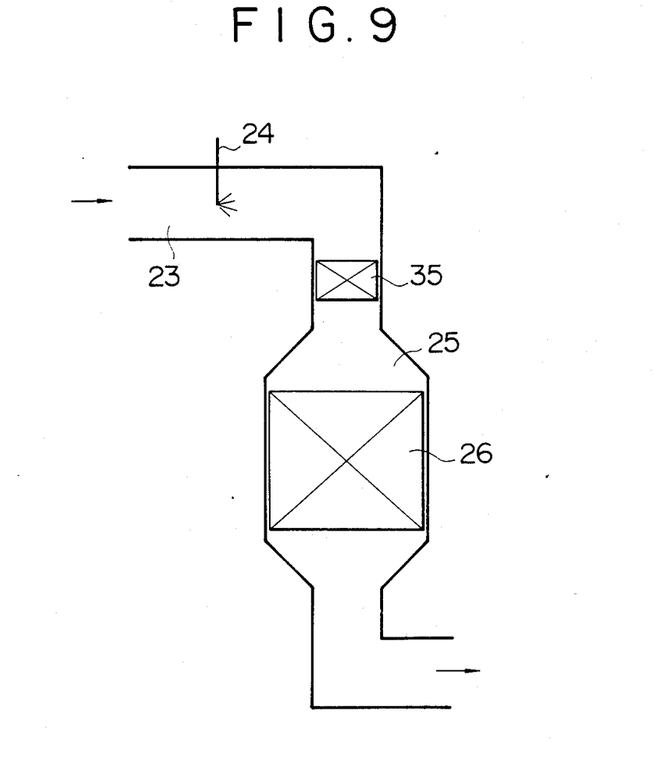
Fig. 9 is an exemplary schematic view of a denitration device regarding the present invention.

As shown in FIG. 9, a dust collision device 35 is disposed on the upstream side of a denitration reactor 25 so as to occupy almost all the sectional area of a duct 23. When the dust in an exhaust gas passes through the collision device 35, they collide successively with collision plates in the collision device 35 in order to separate a sticky material on the surface of each dust grain therefrom, and they are then introduced into the reactor 25.

Figure 10A:
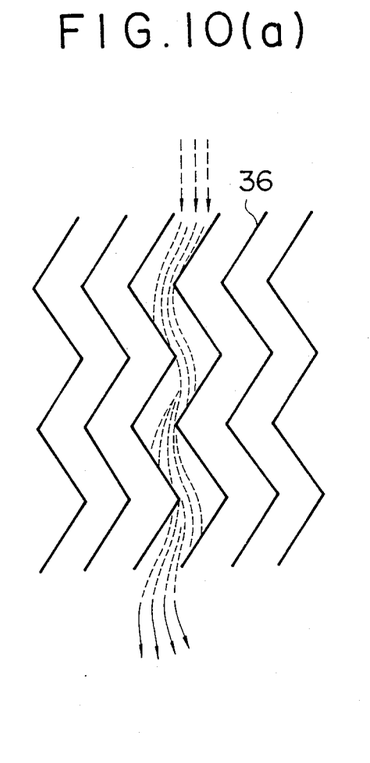
Figs. 10(a) and 10(b) show enlarged sectional views of dust collision plates in Fig. 9.
Figure 10B:
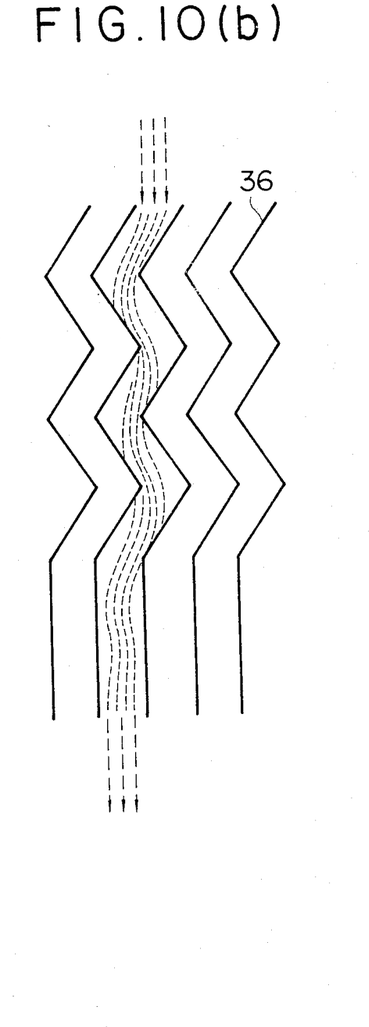

FIGS. 10(a) and 10(b) exemplarily show enlarged views of collision plates 36 in the dust collision device 35 in FIG. 9. In FIG. 10(a), there are arranged the collision plates 36 consisting of plural thin steel plates alternately folded at an angle of 45°. FIG. 10(b) shows the collision plates 36 which are continued from the lower ends of the collision plates 36 in FIG. 10(a). The collision plates 36 in FIG. 10(b) are close to a gas outlet portion, and each space between the adjacent collision plates 36 is narrow so that a dust concentration in the gas outlet portion may be distributed as uniformly as possible.

Figure 11A:
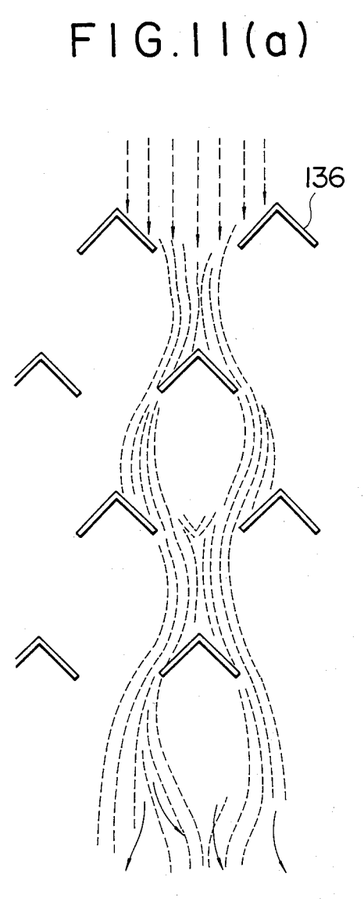
Figs. 11(a) and 11(b) show enlarged sectional views of other type dust collision plates.
Figure 11B:
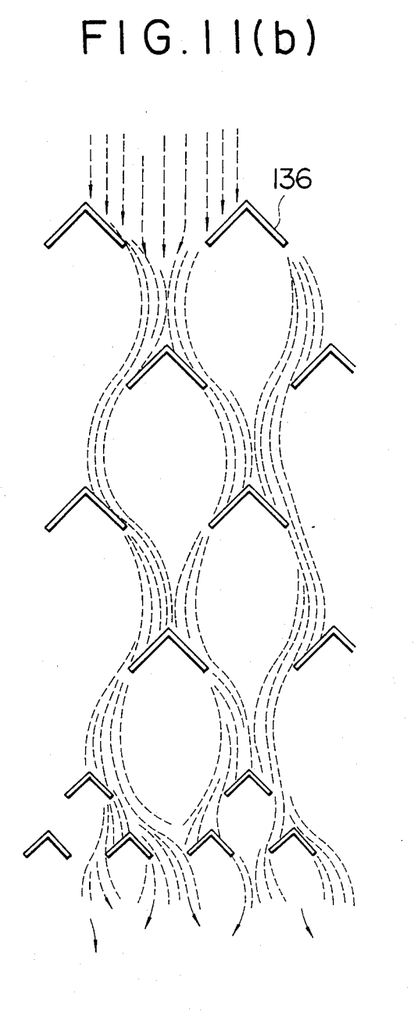
Figure 12:
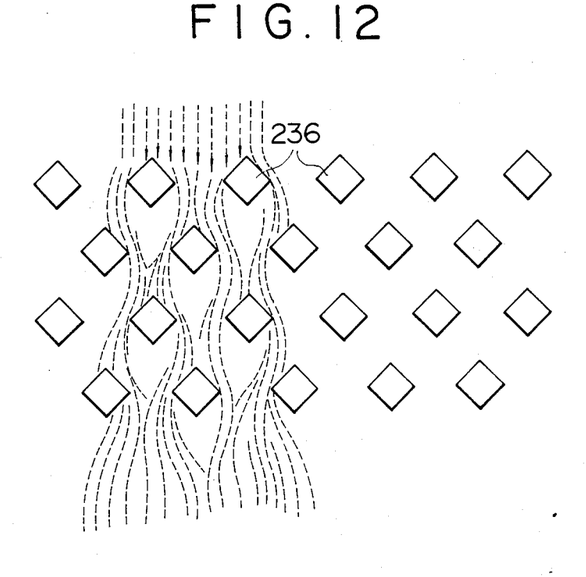
Fig. 12 shows an enlarged sectional view of other type dust collision plates.
Figure 13:
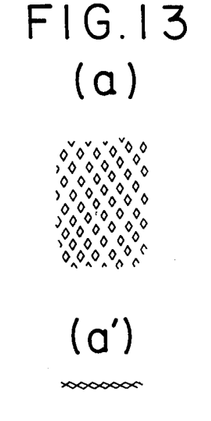

In FIG. 11, there are disposed many collision members 136 each having a V-shaped surface oriented against a flow direction of the exhaust gas. The collision members 136 may be made from, for example, expanded metal plates over each surface of which many openings are arranged uniformly. As shown in FIGS. 11(a) and 11(b) the collision plates 136 are disposed in four lines against the gas stream so that the opening sections may be alternated. FIG. 12 shows an embodiment using the collision members 236 the shape of which is square in the sectional view. In addition, as the collision plates, other members having various shapes as in FIGS. 13(a), 13(b) and 13(c) can be employed in compliance with various conditions. The size of the opening in each collision plate 136 is regulated so as to be equal to or larger than that of an opening in each parallel flow type catalyst (the lattice catalyst 013 in FIG. 15), which constitution can prevent the dust from accumulating on the collision plates and therefore the openings of the collision plates from be clogged therewith.

As a material of these collision plates (i.e., the collision plates having the V-shaped collision surfaces), a steel plate is satisfactory, but more preferable are ceramics such as mullite and the like as well as sintered metals which have suitably coarse surfaces and a wear resistance to the dust collision.

According to the present invention just described, a fly ash contained in an exhaust gas is forced to collide with a solid surface on the upstream side of a parallel flow type catalyst section, so that while streaming through the catalyst section, the fly ash does not stick to catalyst surfaces and the latter can be thereby kept clean. In short, the extremely simple method and apparatus of the present invention permits maintaining the activity of the catalysts for a long period of time.

What is claimed is:

1. In an apparatus for treating exhaust gas containing dust composed of a glassy component and a sticky component including a gas parallel flow type solid-gas contact reactor, the improvement which comprises means for separating the glassy component from the sticky component of the dust, said means comprising barriers positioned in a duct upstream of the reactor so as to collide with the dust contained in the gas flowing toward the reactor, wherein the barriers comprise flat plates, the surfaces of which are positioned at an angle of inclination ranging from 30 to 60 degrees relative to the duct wall, and wherein said barriers are V-shaped and formed by adjoining said plates at an intersection point, and disposed in an opening ratio of $l_1/l_2 \times 100$ of from 30 to 70 % and a space ratio $l_3/2l_1$ of from 1 to 4, and wherein $l_1$ is also the distance between the midpoint of said duct and the end of said flat plate extending away from said duct wall, $l_2$ is the distance between said duct wall and the intersection of two side plates forming said v-shaped barrier, and $l_3$ is the shortest distance between two barriers.

* * * * *